(No Model.)
H. C. SAMPLE.
GALVANIC BATTERY.
No. 455,693. Patented July 7, 1891.
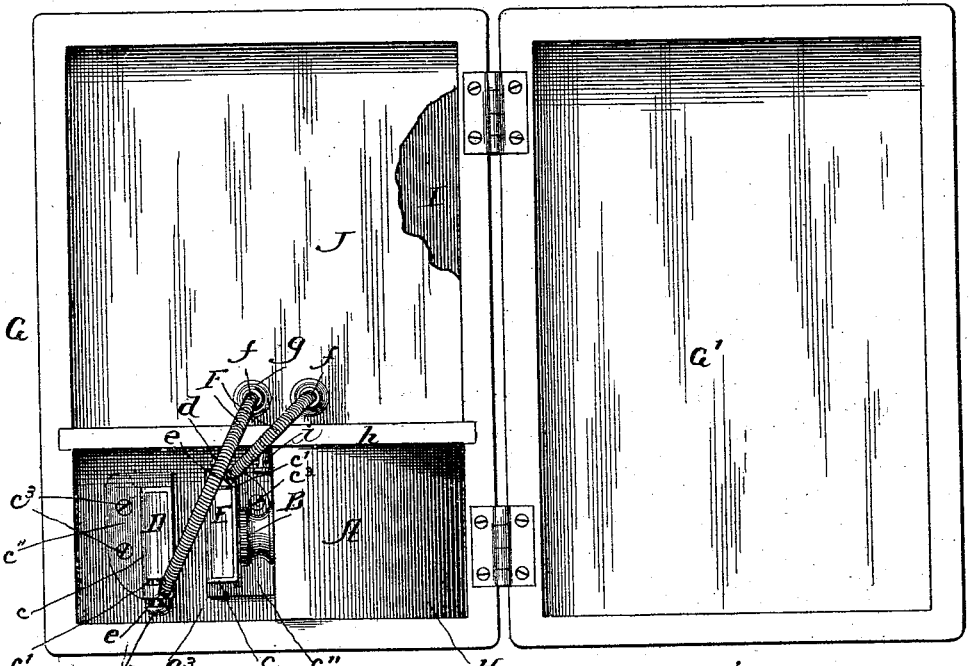
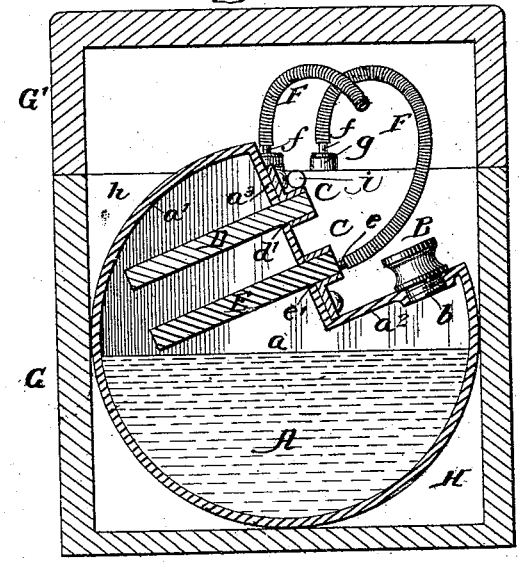
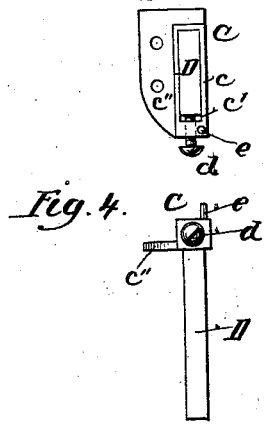
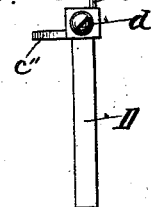
Witnesses:
Inventor:
Henry Clay Sample

UNITED STATES PATENT OFFICE.

HENRY CLAY SAMPLE, OF RAVENSWOOD, ASSIGNOR TO HUGH W. MATTHEWS, OF CHICAGO, ILLINOIS.

GALVANIC BATTERY.

SPECIFICATION forming part of Letters Patent No. 455,693, dated July 7, 1891.

Application filed December 2, 1889. Serial No. 332,293. (No model.)

*To all whom it may concern:*

Be it known that I, HENRY CLAY SAMPLE, a citizen of the United States, residing at Ravenswood, in the county of Cook and State of Illinois, have invented certain new and useful Improvements in Galvanic Batteries; and I do hereby declare that the following is a full, clear, and exact description of the invention, which will enable others skilled in the art to which it pertains to make and use the same, reference being had to the accompanying drawings, in which—

Figure 1 is a top or plan view with the cover open. Fig. 2 is a cross-section through the cell and box with the cover closed; Figs. 3 and 4, a plan view and an end elevation of the socket for attaching the plates.

This invention is more especially designed for use in connection with small batteries contained in a box, so as to be readily transported from place to place, but can be used with other batteries where it is desired to have a ready and quick means of bringing the battery into or throwing it out of use.

The object of the invention is to construct a battery-cell adapted to receive the battery-plates and the fluid and have such cell capable of changing its position for the plates to be in or out of the fluid accordingly as the cell is adjusted, and this without disturbing or changing the attachment of the plates to the cell, and to improve the devices by which the plates are attached to the cell and supported in the solution, and the general construction and arrangement of the cell, the manner of supporting the plates, and the connection between the plates and a rheotome; and its nature consists in providing a battery-cell formed on the arc of a true circle with an open space having walls, one of which has a filling-opening and the other carries the battery-plates, so that the interior of the cell has a single chamber, which in effect is two chambers, in providing a socket or clamp attached to the end wall of the cell, and receiving a battery-plate, and in the several parts and combinations of parts hereinafter described, and pointed out in the claims as new.

In the drawings, A represents the cell made of vulcanized rubber or other non-conducting material on which the battery-fluid will not act. This cell is formed by compressing or molding the vulcanized rubber or other material or otherwise forming it into shape to have two side walls $a$, an annular exterior wall $a'$ formed on the arc of a circle, an end wall $a^2$, and an end wall $a^3$, each starting from the end of the annular outer wall and extending inward to meet and join at or near the center of the circle of the outer wall, as shown in Fig. 2, making a cell in the shape of an incomplete circle with an interior chamber of a corresponding shape.

B is a plug having a screw-threaded end $b$, which enters a screw-threaded hole in the wall $a^2$, through which hole the cell can be filled or charged, and when filled or charged the escape of the fluid is prevented by screwing in the plug B.

C is a socket, made of metal or other suitable material, cast or otherwise formed into shape to have a body $c$ with an opening $c'$ and a flange $c''$ with holes for the passage of screws $c^3$, by means of which the socket as a whole is attached to the end wall $a^3$ of the cell $a$. As shown, two sockets C are used, one for the positive and the other for the negative plates of a battery, and these sockets C are each attached by its flange $c''$ to the end wall $a^3$ of the cell A by screws $c^3$, so that each socket can be readily removed for replacing the plates when the battery is worn out.

D is the positive plate of the battery, the end of which enters the opening $c'$ of a socket C and is held in such opening by a clamping-screw $d$, and this plate D extends through an opening $d'$ in the end wall $a^3$ of the cell A for the main portion of the plate to lie within the chamber of the cell A for the action of the battery-fluid when the cell is properly turned.

E is the negative plate of the battery, the end of which enters the opening $c'$ of a socket C and is held in such opening by a clamping-screw $d$, and this plate E passes through an opening $e'$ in the end wall $a^3$ of the cell A for the main portion of the plate E to lie within the chamber of the cell.

F F are coiled wires forming the connection leading from the battery-plates, for which purpose each wire has one end slipped over a pin $e$ on the socket C and the other end has a pin $f$ to enter the hole in the binding-post $g$, and it is evident that the pin $e$ might be attached to the coiled wire, in which case the socket C would have a hole to receive a pin, and it is also evident that in so far as relates to a connection between the battery-plates such connection could be had by the use of wire ordinarily employed for that purpose.

G is a box having a cover G'.

H is a receptacle for the battery-cell A, formed by dividing the interior of the box by a partition $h$, so as to form a receptacle or chamber corresponding in width to the width of the cell A and of a length equal to the diameter of the cell, so that the cell will fit in such chamber or receptacle snugly, and at the same time be capable of being turned in such chamber.

I is the compartment or chamber of the box, in which the battery appliances can be stored when the battery is not in use.

J is the plate on which is to be mounted a rheotome in the usual manner, which plate also has the binding-post $g$ attached thereto.

The cell A, with its side walls $a$, outer walls $a'$, and end walls $a^2$ and $a^3$, forms a chamber of a corresponding shape, which chamber is, in effect, two chambers by reason of the cell turning, so that the wall $a^2$ will be down and the wall $a^3$ up, as shown in Fig. 2, for the chamber below the end wall $a^2$ to be a chamber in which the fluid will stand, and by turning the end wall $a^2$ up and the end wall $a^3$ down, as shown in Fig. 1, the chamber of the cell below the wall $a^3$ becomes a chamber in which the fluid can stand. The cell A, when turned for the end wall $a^2$ to be down, carries the fluid below the end wall $a^2$ and out of contact with the plates of the battery, and in this position the battery will be out of use; but by turning the cell A for the end wall $a^3$ to be down the battery-fluid is carried into the chamber below the end wall $a^3$ to act on the battery-plates, and when the cell is in this position the battery is ready for use. The cell A can be turned, as shown in Fig. 2, in which position the plates D and E have a slight downward inclination, by which the fluid will drip or run off the plates, thereby preventing any retention of the fluid on the plates; and in order to prevent the cell A from being thrown too far over in turning out of use a stop $i$ is provided on the partition-plate $h$, by which the cell will be stopped at the proper point for the plates D and E to have a slight downward inclination. The clamps or sockets C furnish a ready means for attaching the plates to the cells, as all that is required is to insert the end of a battery-plate into the opening $c'$ of the socket and there secure it by the clamping-screw, so that the plate can be inserted through the slot therefor in the end wall $a^3$, and when inserted the clamp or socket C is attached to the end wall $a^3$ by the flange $c''$ and screws $c^3$, and these sockets C furnish a ready means for attaching the conducting-wires to the pin $e$ or the equivalent of such pin (a hole in the socket) to receive the end of the conducting-wire or a pin attached to the end of the conducting-wire. The cell A can be filled or charged by turning it around for the wall $a^2$ to be down or horizontal, when the plug B can be unscrewed and the cell filled through the plug opening the wall $a^2$, and when filled the plug B is again screwed in, charging the battery ready for use.

The battery can be thrown into or out of use without removing the plates from the cell and without disconnecting the plates from the conducting-wires, and this without any inconvenience or trouble, as all that is required to be done is to turn the cell for either the end wall $a^3$ or the end wall $a^2$ to be down, and such turning is freely permitted by reason of the circular shape of the cell as a whole, and in turning the end walls $a^2$ and $a^3$ furnish a ready means by which the cell can be turned. The cell occupies but a small space in a box or receptacle, and when located in its chamber H of the box G is held between the side walls of such chamber, so that it can be turned to be in position for use or be in position for non-use, and when in either position the cell will retain such position in its chamber or receptacle H without any danger of turning in the ordinary handling of the box G or in carrying the box from place to place.

What I claim as new, and desire to secure by Letters Patent, is—

1. A galvanic-battery cell having a circular peripheral wall and an end wall extending from the center of the cell to the outer wall, with a filling-opening, substantially as and for the purpose specified.

2. A galvanic-battery cell having a circular peripheral wall and an end wall extending from the center of the cell to the peripheral wall, with openings for the insertion of the battery-plates, substantially as and for the purposes specified.

3. A galvanic-battery cell having a circular peripheral wall, an end wall extending from the center of the cell to the peripheral wall, with a filling-opening, and an end wall extending from the center of the cell to the peripheral wall, with openings for inserting the battery-plates, and the two end walls starting from the same point at the center of the cell extending at an angle to each other, substantially as and for the purposes specified.

4. A galvanic-battery cell having a circular peripheral wall and an end wall extending from the center of the cell to the peripheral wall and provided with openings for inserting the battery-plates, in combination with a clamp receiving a battery-plate for attaching the battery-plates to the cell, substantially as and for the purposes specified.

5. The clamp C, having a body $c$, with an opening $c'$, and a flange $c''$, in combination with a battery-plate and a clamping-screw for securing the battery-plates to a cell, substantially as specified.

6. A clamp C, having a body $c$, with an opening $c'$, and a flange $c''$, in combination with a battery-plate and a conducting-wire, both attached to the clamp C, substantially as and for the purposes specified.

7. The circular cell A of a galvanic battery, in combination with a carrying-box having a compartment to receive and retain the cell A in any desired position by frictional contact between the side walls of the cell and the side faces of the compartment, substantially as and for the purposes specified.

8. The cell A, having the end walls $a^2$ $a^3$ and clamps C, supporting the battery-plates, in combination with the box G, having the chamber H, receiving the cell A and holding the cell in position by the frictional contact of the side walls of the cell and its chamber H, substantially as and for the purposes specified.

9. The cell A, having the end walls $a^2$ $a^3$, clamps C, carrying the battery-plates, and wires F, in combination with the box G, having the chamber H, receiving the cell A and holding such cell in position by the frictional contact of the side walls of the cell and the chamber H, substantially as and for the purposes specified.

10. The cell A, having the end walls $a^2$ $a^3$, in combination with the chamber H and a stop for limiting the turning of the cell A, substantially as and for the purposes specified.

HENRY CLAY SAMPLE.

Witnesses:
  O. W. BOND,
  GEO. B. REYNOLDS.